(12) United States Patent
Sibley, Jr. et al.

(10) Patent No.: US 8,342,557 B2
(45) Date of Patent: Jan. 1, 2013

(54) FIFTH WHEEL SLIDER ASSEMBLY

(75) Inventors: Richard J. Sibley, Jr., Grand Haven, MI (US); Gregory R. Thorwall, Holland, MI (US); Rudolph A. Bahnsen, Zeeland, MI (US); Justin D. Keatley, Zeeland, MI (US); John G. Wieringa, Zeeland, MI (US); Gerry W. Hungerink, Holland, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 13/227,100

(22) Filed: Sep. 7, 2011

(65) Prior Publication Data

US 2012/0007336 A1    Jan. 12, 2012

Related U.S. Application Data

(62) Division of application No. 11/369,496, filed on Mar. 7, 2006, now abandoned.

(60) Provisional application No. 60/659,796, filed on Mar. 9, 2005.

(51) Int. Cl.
*B62D 53/08*    (2006.01)

(52) U.S. Cl. .................... 280/438.1; 280/433

(58) Field of Classification Search .......... 280/433, 280/438.1, 439, 440, 441, 149.2
See application file for complete search history.

(56) References Cited

U.S. PATENT DOCUMENTS

| | | | |
|---|---|---|---|
| 3,117,772 | A | 1/1964 | Brown |
| 3,606,384 | A | 9/1971 | Fontaine et al. |
| 3,729,214 | A | 4/1973 | Mulcahy et al. |
| 4,443,025 | A | 4/1984 | Martin et al. |
| 6,488,305 | B2 | 12/2002 | Laarman |
| 6,592,140 | B1 | 7/2003 | Alguera Gallego et al. |
| 6,736,420 | B2 | 5/2004 | Laarman et al. |
| 2002/0121762 | A1 | 9/2002 | Laarman |
| 2002/0175493 | A1 | 11/2002 | Laarman |
| 2002/0175494 | A1 | 11/2002 | Laarman |
| 2002/0175495 | A1 | 11/2002 | Laarman |
| 2004/0173992 | A1 | 9/2004 | Stunder et al. |

*Primary Examiner* — Anne Marie M Boehler
(74) *Attorney, Agent, or Firm* — Price Heneveld LLP

(57) ABSTRACT

A fifth wheel slider assembly includes a hitch plate with a throat for receiving a king pin of a trailer, and a slider assembly that includes at least one rack member having a first side and a second side and supportable above a vehicle frame. The slider assembly further includes a first portion including a guide plate slidably abutting the second side of the at least one rack member, and an engagement assembly releasably engaging the at least one rack member at incremental points along a length of the at least one rack member, thereby selectively positioning the hitch plate with respect to the at least one rack member, and a second portion including at least one support bracket pivotably supporting the hitch plate, slidably abutting the first side of the at least one rack member, and readily releasably coupled to the first portion of the slider assembly.

21 Claims, 5 Drawing Sheets

FIFTH WHEEL SLIDER ASSEMBLY

CROSS REFERENCE TO RELATED APPLICATION

This application is a divisional of U.S. patent application Ser. No. 11/369,496, filed Mar. 7, 2006 now abandoned, entitled, FIFTH WHEEL SLIDER ASSEMBLY which claims the benefit of U.S. Provisional Application No. 60/659,796, filed Mar. 9, 2005, entitled FIFTH WHEEL SLIDER ASSEMBLY, which is hereby incorporated herein by reference in its entirety.

BACKGROUND OF THE INVENTION

The present invention relates to fifth wheel coupling assemblies, and in particular to a slider assembly for adjustably supporting a fifth wheel hitch assembly from a frame of an associated vehicle.

Fifth wheel hitch assemblies are used in a wide variety of applications to releasably couple a trailer to an associated towing vehicle, including heavy-duty, over-the-road, tractors. The frames of the tractors, to which the fifth wheel assemblies are mounted, typically comprise a pair of longitudinally-extending C-shaped channel members that are supported by the wheel and axle members of the vehicle. The channel members are laterally spaced apart from one another such that they provide a planar surface for resisting normal and twisting forces after the fifth wheel is secured thereupon and placed in operation, thereby transferring the payload of the trailer equally onto each of the channel members. The fifth wheel hitch assembly can be mounted on the truck frame in a number of various ways, such as by utilizing drop-over angle brackets or flat mounting plates.

The drop-over method utilizes an L-shaped angle member which conforms and communicates with the top and vertical edges of each of the channels, having a long vertical leg securely fixed to an outboard vertical side of the associated channel, and a horizontal leg of the drop-over bracket that typically includes an arcuately-shaped mounting bracket which is welded thereon. The arcuate mounting bracket lies generally above the top horizontal leg of the C-shaped channel, and includes a horizontally-aligned bore for accepting a coupling cross pin which is in communication with the fifth wheel frame work. Specifically, the fifth wheel frame work includes a flange on one or each peripheral edge that communicates with the arcuate mounting bracket, thereby allowing the flange ports on each flange to be horizontally aligned with the mounting bracket bore for pinning the fifth wheel to the drop-over angle mounting bracket and hence, to the tractor frame. Although the drop-over brackets transmit lateral inertial forces which are caused by curving and rocking of the fifth wheel into the frame, drop-over arrangements are best suited for resisting longitudinal forces and moments caused from acceleration, deceleration, as well as the downward forces acting on the ramps eccentric to the rear of the bracket pivot center during coupling.

Alternatively, a flat plate mounting assembly includes a rectangular, planar plate of steel that is secured on top of each of the channel members, with the lateral sides of the plate extending slightly beyond each channel. In order to transfer loads from the plate to the frame, a section of L-shaped angle, typically referred to as the outboard angle, is used to support the plate directly below the overhang. The outboard angle member is also secured to the tractor channel and the flat mounting plate by securing a horizontal leg thereof to the bottom side of the mounting plate and securing a vertical leg thereof to the vertical wall of the associated channel. Similar arcuate mounting brackets to those discussed above are welded to the top of the mounting plate. The flat mounting plate method of attachment offers increased fatigue strength when compared to the drop-over mounting assembly because the lateral forces and moments that work upon the arcuate mounting bracket are first distributed throughout the entire flat plate surface area before they are distributed and transferred into the outboard angle member, thereby increasing the surface area over which the load is distributed. However, one significant disadvantage of the flat plat mounting arrangement is the use of a heavy steel plate adding to the weight and total cost of the overall assembly.

Another significant disadvantage to each of these arrangements as discussed above is the significant welding the overall assemblies require, thereby increasing the manufacturing costs and decreasing the adjustability and variability of the overall assembly once installed. Still further, these designs typically extend below the upper surface of the associated vehicle frame or channel members, thereby requiring precise placement of laterally-extending structural frame members of either the truck frame or the fifth wheel slider assembly, and/or rerouting of associated electrical and hydraulic lines.

Still further, typical fifth wheel assemblies that provide for slidable adjustment of the associated fifth wheel hitch plate with respect to the vehicle frame members require the use of separate stock members affixed to either a component of the fifth wheel assembly or the frame rails, in order to limit the travel of the fifth wheel hitch plate with respect to the vehicle frame rails, thereby adding to the costs associated with the manufacture of the fifth wheel hitch assembly.

A fifth wheel hitch assembly is desired that reduces the number of components necessary to provide a slidable adjustment of an associated hitch plate with respect to supporting vehicle frame rails, while simultaneously providing for easy adjustment and replacement of worn or damaged components. The fifth wheel hitch assembly should further reduce the associated weight, reduce manufacturing costs by eliminating welding and other time consuming processes, provide a modular design that allows easy assembly and/or retrofitting, and allows for use with various truck frame designs without requiring significant reworking to either the hitch assembly of the truck frame.

SUMMARY OF THE INVENTION

One aspect of the present invention is to provide a fifth wheel slider assembly that comprises a hitch plate with a throat for receiving a king pin of a trailer, and a slider assembly that comprises at least one rack member having a first side and a second side and supportable above a vehicle frame. The slider assembly further comprises a first portion including a guide plate slidably abutting the second side of the at least one rack member, and an engagement assembly releasably engaging the at least one rack member at incremental points along a length of the at least one rack member, thereby selectively positioning the hitch plate with respect to the at least one rack member, and a second portion including at least one support bracket pivotably supporting the hitch plate, slidably abutting the first side of the at least one rack member, and readily releasably coupled to the first portion of the slider assembly.

Another aspect of the present invention is to provide a fifth wheel slider assembly that comprises a hitch plate with a throat for receiving a king pin of a trailer, and a slider assembly that comprises at least one rack member having a first side and a second side and supportable above a vehicle frame. The slider assembly further comprises first portion adapted to slidably abut the second side of the at least one rack member and to releasably engage the at least one rack member at incremental points along a length of the at least one rack member, thereby selectively positioning the hitch plate with respect to the at least one rack member, and a second portion including at least one support bracket pivotably supporting the hitch plate, slidably abutting the first side of the at least one rack member, and readily releasably coupled to the first portion of the slider assembly.

The present inventive fifth wheel hitch assembly reduces the number of components necessary to provide a slidable adjustment of an associated hitch plate with respect to supporting vehicle frame rails, while simultaneously providing for easy adjustment and replacement of worn or damaged components. The hitch assembly further reduces the associated weight, reduces manufacturing costs by eliminating welding and other time consuming processes, provides a modular design that allows easy assembly and/or retrofitting, allows for use with various truck frame designs without requiring significant reworking to either the hitch assembly of the truck frame, is economical to manufacture, and is particularly well adapted for the proposed use.

DETAILED DESCRIPTION OF THE PREFERRED EMBODIMENTS

Figure 1:
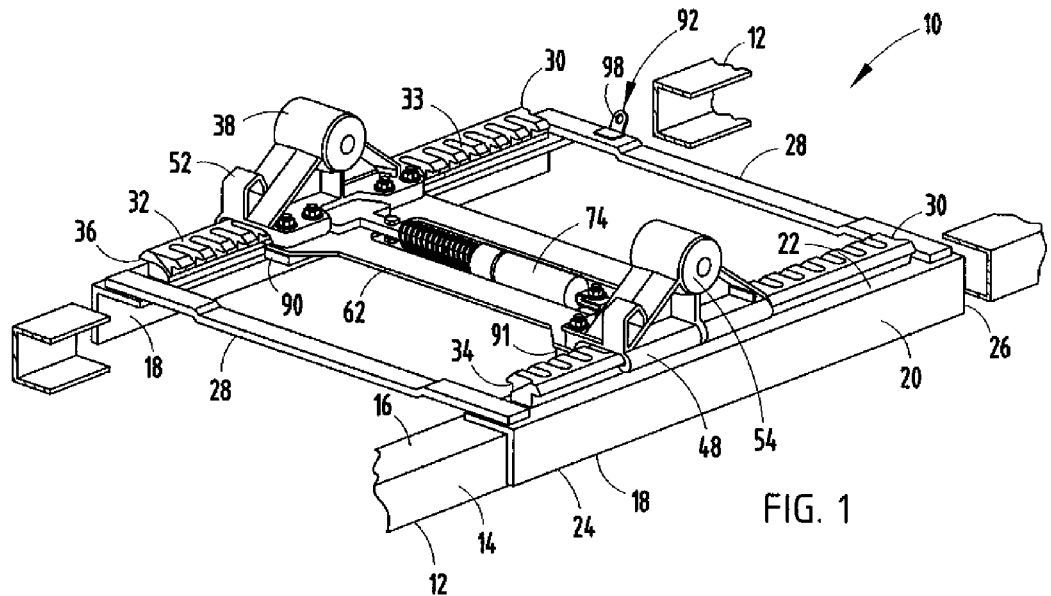
FIG. 1 is a top perspective view of a fifth wheel slider assembly embodying the present invention.
Figure 2:
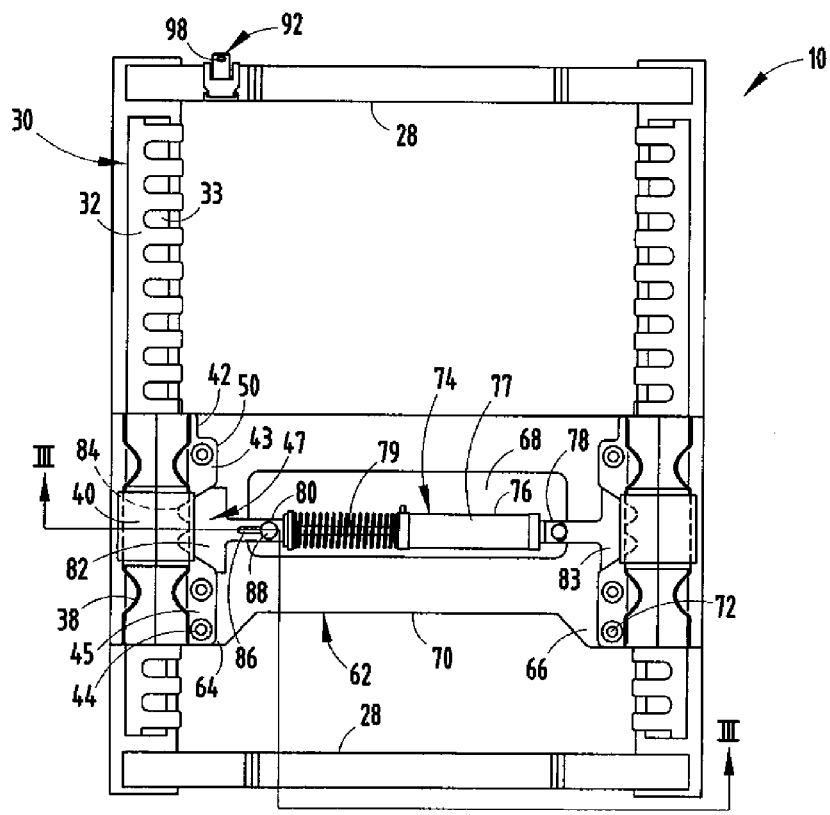
FIG. 2 is a top plan view of the fifth wheel slider assembly.
Figure 3:
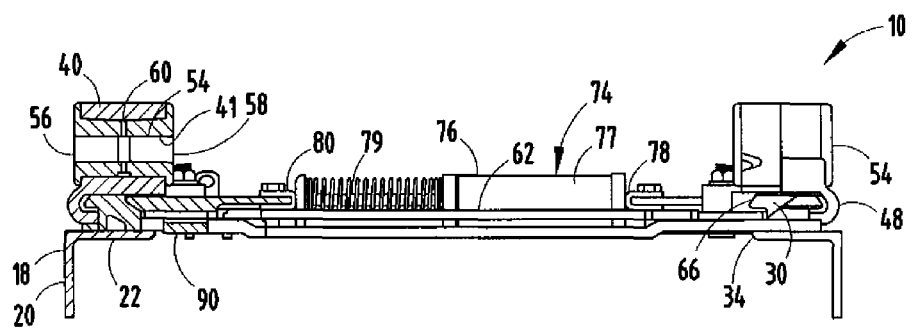
FIG. 3 is a partial cross-sectional view of the fifth wheel slider assembly, taken along the line III-III, FIG. 2.
Figure 4:
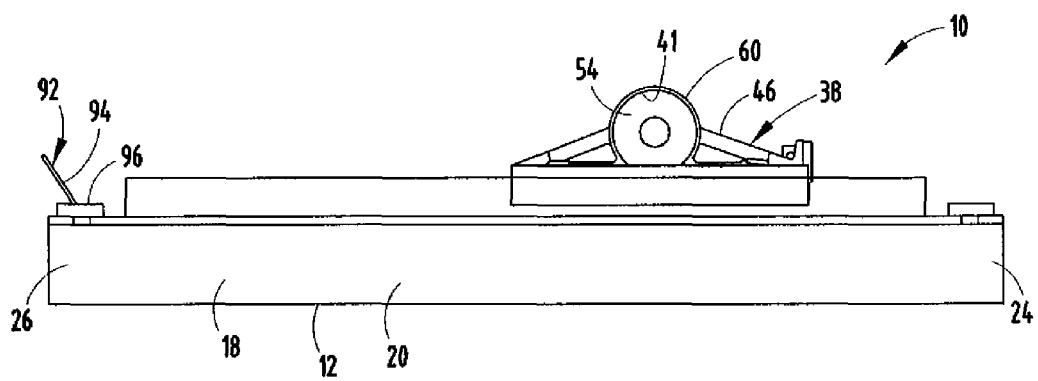
FIG. 4 is a side view of the fifth wheel slider assembly.
Figure 5:
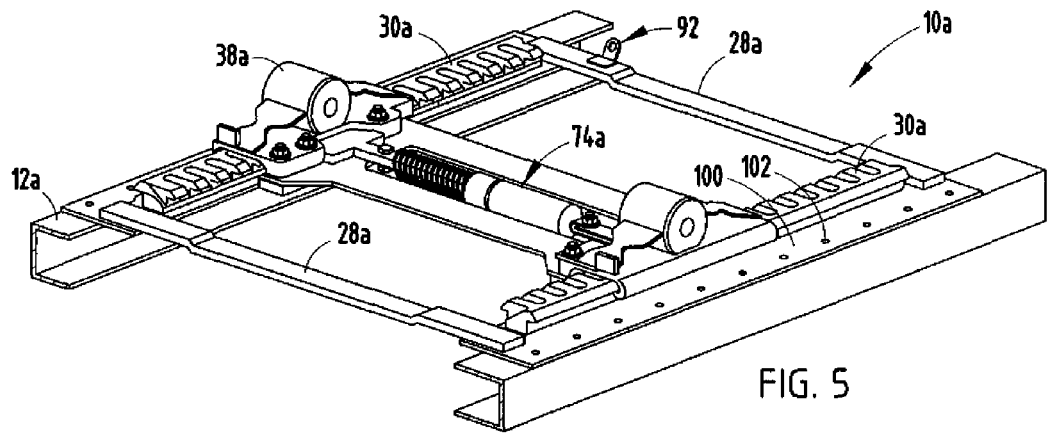
FIG. 5 is a top perspective view of a first alternative embodiment of the fifth wheel slider assembly.
Figure 8:
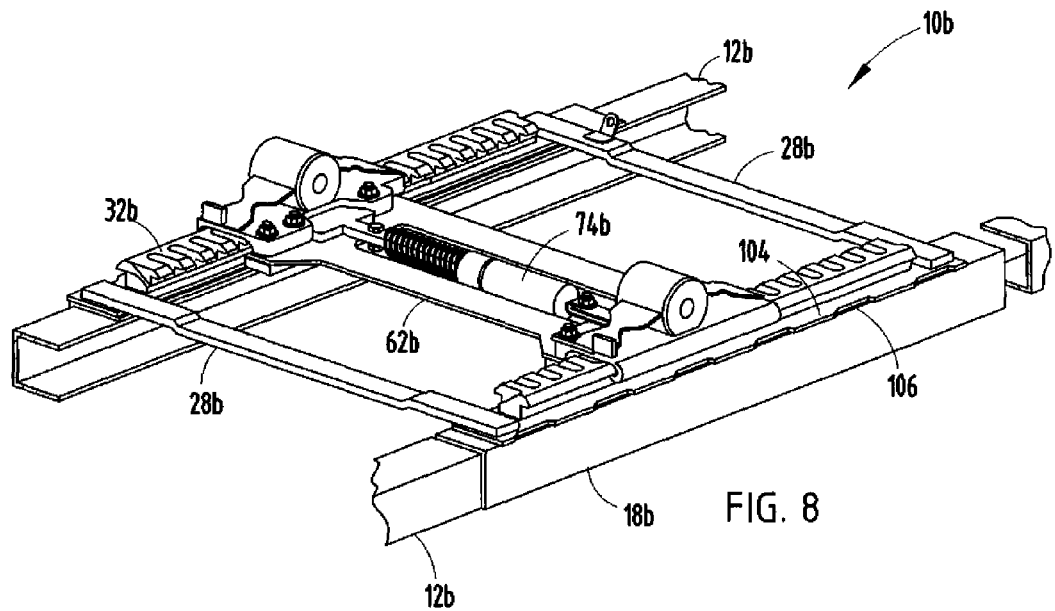
FIG. 8 is a top perspective view of a second alternative embodiment of the fifth wheel slider assembly.
Figure 9:
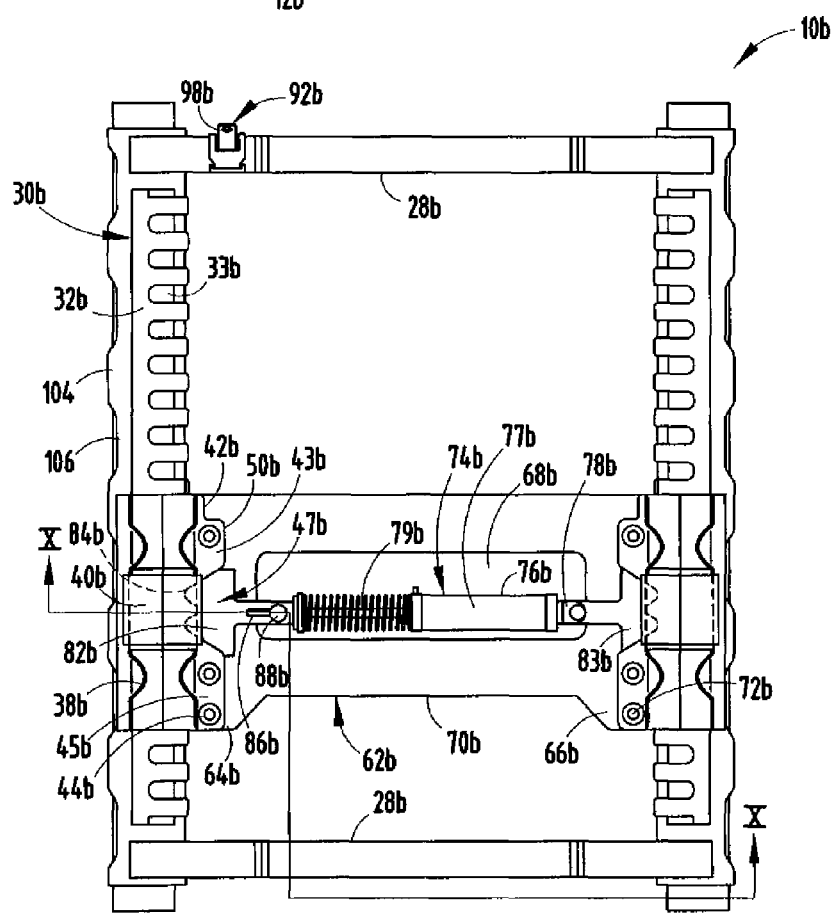
FIG. 9 is a top plan view of the second alternative embodiment of the fifth wheel slider assembly.
Figure 10:
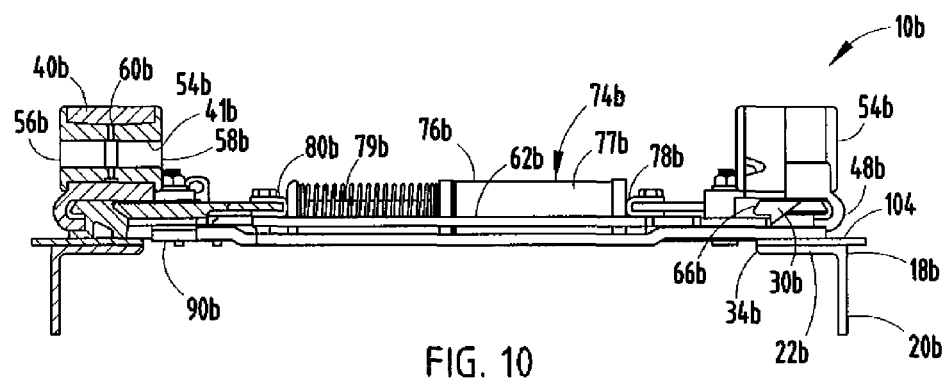
FIG. 10 is a partial cross-sectional view of the second alternative embodiment of the fifth wheel slider assembly, taken along the line X-X, FIG. 9.
Figure 11:
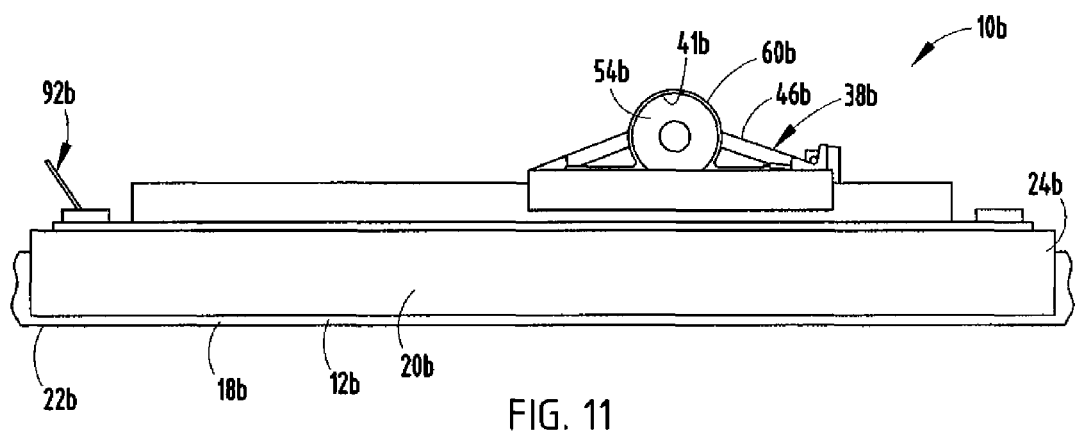
FIG. 11 is a side view of the second alternative embodiment of the fifth wheel slider assembly.

For purposes of description herein, the terms "upper," "lower," "right," "left," "rear," "front," "vertical," "horizontal," and derivatives thereof shall relate to the invention as oriented in FIGS. 1, 5 and 8. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1-4) generally designates a fifth wheel slider assembly embodying the present invention. In the illustrated example, the fifth wheel slider assembly is supported by a pair of vehicle frame rails 12 each having an outer vertical surface 14 and a top horizontal surface 16. The slider assembly 10 includes a pair of L-shaped angle brackets 18 each having a downwardly-extending vertical leg 20, an inwardly-extending horizontal leg 22, a first end 24 and a second end 26. A pair of laterally-extending structural support members 28 extend between the first ends 24 and the second ends 26 of the angle brackets 28, and are preferably fixedly secured thereto by welding, or the like. A pair of rack members 30 are fixedly secured by a weld to a horizontal leg 22 of a respective angle bracket 18. Each rack member 30 includes a plurality of notches 33 spaced incrementally along the length thereof. Each rack member 30 is provided with a T-shaped cross-sectional configuration having a top surface 32, an inner lip 34, and an outer lip 36.

The slider assembly 10 further includes a pair of support brackets 38 slidably engaging and extending upwardly from a respective rack member 30. Each support bracket 38 includes a bushing housing 40 each having an aperture 41 extending therethrough, a base plate member 42 having a plurality of bolt receiving apertures 44 extending therethrough, and a plurality of support arms 46 extending between the bushing housing 40 and the base plate member 42. The base plate member 42 includes a longitudinally-extending outwardly and downwardly-curled guide edge 48 that slidably receives the outer lip 36 of the respective rack member 30 therein. An inwardly-extending lip 50 of the base plate member 42 includes the apertures 44 and is divided into a first portion 43 and a second portion 45, thereby defining a gap 47 therebetween. Each support bracket 38 includes a tilt stop member 52 extending upwardly from a support arm 46 and the base plate 42. As in the illustrated example, the tilt stop member 52 is preferably integrally molded with the support bracket 38. In assembly, a two-piece bushing 54 having a first portion 56 and a second portion 58 divided from one another at a center line 60. The division of the bushing 54 into the first portion 56 and the second portion 58 provides easier assembly and/or replacement due to the narrowing draft of the aperture 41, as well as reduces the need for cleaning the inner bore of the aperture 41 of cast parting lines formed during the manufacture of the support bracket 38.

The slider assembly 10 further includes a hitch plate (not shown) that is pivotally coupled to the support brackets 38 by at least one pivot pin that extends into the bushing 54 in a manner as know in the art. During operation, the tilt stop members 52 limit the amount of tilt travel of the hitch plate with respect to the support brackets 38.

The slider assembly 10 further includes a guide plate 62 having a first end 64, a second end 66, a centrally-located aperture 68 and a recessed side relief 70 functioning to reduce the overall weight of the guide plate 62. The first end 64 and second end 66 of the guide plate 62 are secured to the inner lip 50 of each base plate member 42 by a plurality of bolts 72. The guide plate 62 is configured such that the first end 64 and the second end 66 guide beneath the outer lip 36 of a respective rack member 30.

The slider assembly 10 further includes an engagement assembly 74 including a pneumatic cylinder 76 having a housing 77 with a first end 78 and a rod 79 with a second end 80. The engagement assembly 74 further includes a first lock member 82 and a second lock member 83 each slidably received within the respective gap 47 and each having a plurality of engagement teeth 84 that are releasably engaged within the notches 33, thereby fixing the location of the support brackets 38 with respect to the rack members 30, and in turn fixing the location of the hitch plate with respect to the frame rails 12. Preferably, at least one of the lock members 82, 83 includes an extended slot aperture 86 extending therethrough and that receives a mechanical fastener such as a bolt 88 securing the end 78, 80 to the lock member 82, 83 and allowing slight movement of the couple therebetween.

The slider assembly 10 further includes a stop member 90 located proximate the first end 64 and a stop member 91 located proximate the second end 66 of the guide plate 62 and secured thereto via the mechanical fasteners or bolts 72. Each of the stop members 90, 91 are juxtaposed across the guide plate 62 from one another and are positioned so as to abut the structural support members 28, thereby limiting the travel of the support brackets 38 with respect to the rack members 30, and as a result, the travel of the fifth wheel hitch plate with respect to the frame rails 12.

The slider assembly 10 further includes a bulkhead bracket 92 having a guidepost 94 and a U-shaped clip 96 integrally formed with the guidepost 94 and that frictionally engages structural support member 28. The guide post 92 includes an aperture 98 extending therethrough, and through which hydraulic, electrical, and other communication/control lines extending between the trailer and towing vehicle are guided so as to reduce the possibility of damage thereto.

Figure 6:
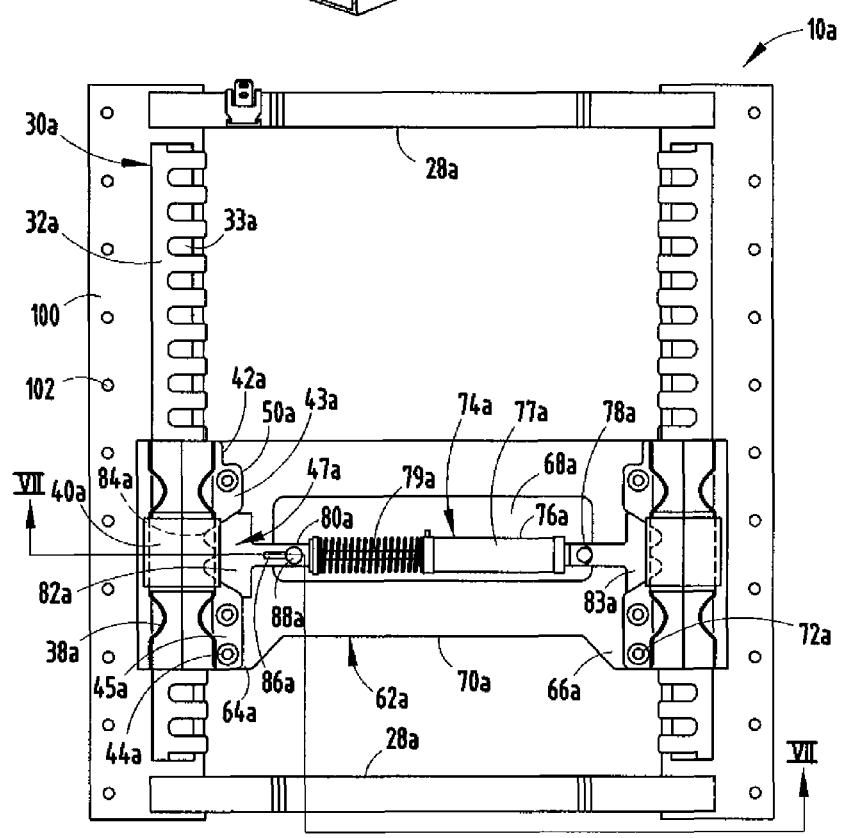
FIG. 6 is a top plan view of the first alternative embodiment of the fifth wheel slider assembly.
Figure 7:
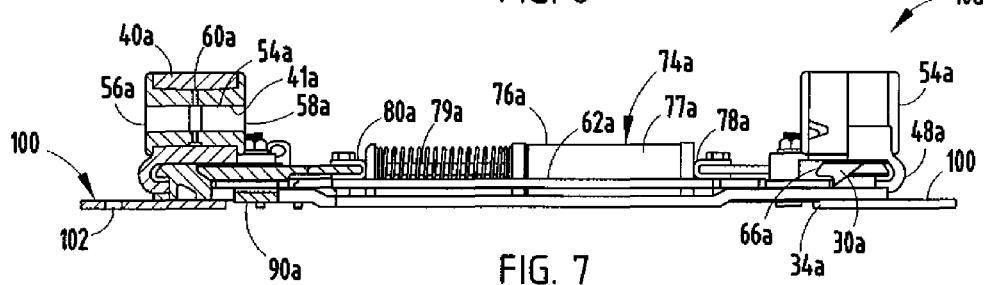
FIG. 7 is a partial cross-sectional end view of the first alternative embodiment of the fifth wheel slider assembly, taken along the line VII-VII, FIG. 6.

The reference numeral 10a (FIGS. 5-7) generally designates another embodiment of the fifth wheel slider assembly. Since the slider assembly 10a is similar to the previously described slider assembly 10, similar parts appearing in FIGS. 1-4 and FIGS. 5-7, respectively are represented by the same, corresponding reference numeral except for the suffix "a" in the numerals of the latter. The slider assembly 10a is similar to the slider assembly 10 with the main exception being the replacement of the L-shaped angle brackets 18 with planar outboard mounting plates 100, and the addition of mounting angles 101. In the illustrated example, the mounting plates 100 includes a plurality of apertures 102 spaced along the length thereof and that are adapted to receive mounting hardware such as bolts (not shown) therein to secure the mounting plates 100 and thereby the slider assembly 10a to the associated mounting angles 101. The mounting angles 101 extend longitudinally along the associated frame rails 12a and each include a first portion 103 and a second portion 105 extending orthogonally downward from the first portion 103 and secured to the associated frame rail 12a.

The reference numeral 10b (FIGS. 8-11) generally designates another alternative embodiment of the fifth wheel slider assembly. Since the slider assembly 10b is similar to the previously described slider assembly 10, similar parts appearing in FIGS. 1-4 and FIGS. 8-11, respectively are represented by the same, corresponding reference numeral except for the suffix "b" in the numerals of the latter. The slider assembly 10b is similar in construction to the slider assembly 10, with the main difference being the addition of a pair of over the frame mounting plates 104 welded to the top of the horizontal leg 22b of each angle bracket 18b. In the illustrated example, each over the frame mounting bracket 104 includes a plurality of notches 106 extending and spaced along the length of the mounting plate 104. The slider assembly 10b is secured to the associated frame rails 12b by welding the angle brackets 18b to the frame rails 12b.

The present inventive fifth wheel hitch assembly reduces the number of components necessary to provide a slidable adjustment of an associated hitch plate with respect to supporting vehicle frame rails, while simultaneously providing for easy adjustment and replacement of worn or damaged components. The hitch assembly further reduces the associated weight, reduces manufacturing costs by eliminating welding and other time consuming processes, provides a modular design that allows easy assembly and/or retrofitting, allows for use with various truck frame designs without requiring significant reworking to either the hitch assembly of the truck frame, is economical to manufacture, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fifth wheel slider assembly, comprising:
   a hitch plate with a throat for receiving a kingpin of a trailer; and
   a slider assembly, comprising:
      at least one rack member having a first side and a second side and
      supportable above a vehicle frame;
      a first portion including a guide plate slidably abutting the second side of the at least one rack member, wherein at least a portion of the guide plate is positioned directly vertically below at least a portion of the at least one rack member, and an engagement assembly releasably engaging the at least one rack member at incremental points along a length of the at least one rack member, thereby selectively positioning the hitch plate with respect to the at least one rack member; and
      a second portion including at least one support bracket pivotably supporting the hitch plate, slidably abutting the first side of the at least one rack member, and readily releasably coupled to the first portion of the slider assembly.

2. The fifth wheel slider assembly of claim 1, wherein the at least one support bracket is detachably coupled to the first portion of the slider assembly by a plurality of mechanical fasteners.

3. The fifth wheel slider assembly of claim 2, wherein the plurality of mechanical fasteners includes a plurality of nuts and bolts.

4. The fifth wheel slider assembly of claim 1, further including:
   a pair of mounting members fixably secured to the at least one rack member and fixably securable to a vehicle frame, thereby supporting the hitch assembly above a vehicle frame.

5. The fifth wheel slider assembly of claim 4, further including a pair of lateral support members extending between the mounting members.

6. The fifth wheel slider assembly of claim 5, further including:
   at least one stop member connected to at least one of the support brackets and adapted to abut at least one of the lateral support members, thereby limiting an amount of travel of the hitch along the length of the at least one rack member.

7. The fifth wheel slider assembly of claim 6, wherein the at least one stop member is connected to at least one of the support brackets by the mechanical fasteners coupling the guide plate to the support brackets.

8. The fifth wheel slider assembly of claim 1, wherein the engagement assembly includes a pneumatic cylinder.

9. The fifth wheel slider assembly of claim 8, wherein the engagement assembly further comprises at least one lock member releasably engagable with the at least one rack member at the incremental points along the length of the at least one rack member, and wherein the at least one lock member is actuated by the pneumatic cylinder between an engaged position and an unengaged position.

10. The fifth wheel slider assembly of claim 1, wherein each of the support brackets includes an integrally formed tilt stop adapted to abut the hitch plate, thereby limiting a pivoting travel of the hitch plate with respect to the support brackets.

11. The fifth wheel slider assembly of claim 1, wherein each of the support brackets includes a pivot aperture; and further including:
   a two-piece elastically resilient bushing mounted within each of the pivot apertures.

12. A fifth wheel slider assembly, comprising:
   a hitch plate with a throat for receiving a kingpin of a trailer; and
   a slider assembly, comprising:
      at least one rack member having a first side and a second side and
      supportable above a vehicle frame;
   a first portion adapted to slidably abut the second side of the at least one rack member and to releasably engage the at least one rack member at incremental points along a length of the at least one rack member, thereby selectively positioning the hitch plate with respect to the at least one rack member, wherein at least a portion of the first portion is positioned directly vertically below at least a portion of the at least one rack member; and
   a second portion including at least one support bracket pivotably supporting the hitch plate, slidably abutting the first side of the at least one rack member, and readily releasably coupled to the first portion of the slider assembly.

13. The fifth wheel slider assembly of claim 12, wherein the at least one support bracket is detachably coupled to the first portion of the slider assembly by a plurality of mechanical fasteners.

14. The fifth wheel slider assembly of claim 13, wherein the plurality of mechanical fasteners includes a plurality of nuts and bolts.

15. The fifth wheel slider assembly of claim 12, further including:
   a pair of mounting members fixably secured to the at least one rack member and fixably securable to a vehicle frame, thereby supporting the hitch assembly above a vehicle frame.

16. The fifth wheel slider assembly of claim 15, further including a pair of lateral support members extending between the mounting members.

17. The fifth wheel slider assembly of claim 16, further including:
   at least one stop member connected to at least one of the support brackets and adapted to abut at least one of the lateral support members, thereby limiting an amount of travel of the hitch along the length of the at least one rack member.

18. The fifth wheel slider assembly of claim 17, wherein the at least one stop member is connected to at least one of the support brackets by the mechanical fasteners coupling the guide plate to the support brackets.

19. The fifth wheel slider assembly of claim 12, wherein the first portion of the slider assembly includes an engagement assembly that includes a pneumatic cylinder.

20. The fifth wheel slider assembly of claim 19, wherein the engagement assembly further comprises at least one lock member releasably engageable with the at least one rack member at the incremental points along the length of the at least one rack member, and wherein the at least one lock member is actuated by the pneumatic cylinder between an engaged position and an unengaged position.

21. A fifth wheel slider assembly, comprising:
   at least one rack member having a first side and a second side, the at least one rack member supportable above a vehicle frame;
   at least one mounting member fixably secured to the at least one rack member and fixably securable to the vehicle frame to support the fifth wheel slider assembly above the vehicle frame;
   a hitch plate with a throat for receiving a kingpin of a trailer;
   at least one support bracket pivotably supporting the hitch plate and slidably abutting the first side of the at least one rack member;
   a guide plate slidably abutting the second side of the at least one rack member, wherein the at least one support bracket is readily releasably coupled to the guide plate by a plurality of mechanical fasteners, and wherein at least a portion of the guide plate is positioned directly vertically below at least a portion of the at least one rack member; and
   an engagement assembly releasably engaging the at least one rack member at incremental points along a length of the at least one rack member, thereby selectively positioning the hitch plate with respect to the at least one rack member, wherein the engagement assembly is held between at least one mounting member, and wherein the engagement assembly is adapted to be removed from the slider assembly by uncoupling the at least support bracket from the guide plate and while the guide plate abuts the second surface of the rack member.

* * * * *